United States Patent Office 3,413,485

Patented Nov. 26, 1968

3,413,485

REGULABLE REACTORS AND GATE CIRCUITS USING THEM

Shintaro Oshima, 426, 2-chome, Higashi-machi, Kichijoji, Musashino-shi, Tokyo-to, Japan

Filed Feb. 24, 1965, Ser. No. 434,977
Claims priority, application Japan, Mar. 2, 1964, 39/11,344
18 Claims. (Cl. 307—88)

This invention relates to regulable reactors and more particularly to regulable reactors in which conductors with ferromagnetic film deposited thereon are used and to their application to magnetic gate circuits.

There have been heretofore many kinds of gating means such as tubes, transistors, Esaki diodes, and parametrons. In such gating means, (1) means using active elements have such disadvantages as large sizes, high prices and short lives, and (2) magnetic gate means are generally composed of ferrite material, so that their operation speeds are relatively slow and devices dependent thereon become large in size. Since conventional memory devices employed in computers are, moreover, of relatively large size of ferrite core memories, memory stacks including peripheral circuitry accordingly become large in size and uneconomical. In order to solve such problems, wire memory matrices (U.S. application Ser. No. 309,469 and 309,470 both filed on Sept. 17, 1963, entitled "Wire Memory Matrix" and "Woven Wire Memory Matrix") using conductive wire with ferromagnetic film deposited thereon have been developed. Suitable gate means for the wire memory matrices, however, have not been proposed.

An object of this invention is to provide regulable reactors applicable to gate means which have high reliability and are operable at high speed.

Another object of the invention is to provide miniature gate means suitable for such wire memory devices.

Said object or objects of this invention have been attained by a regulable reactor according to this invention comprising first and second conductors and a magnetic substance. The conductors are magnetically connected to the magnetic substance, and characterized in that one of the conductors is provided with ferromagnetic film deposited thereon having an easy direction of magnetization and applied thereto an appropriate small signal thereby magnetizing said film in the easy direction. The small signal is less than the intensity producible of a magnetomotive force which is equal to the coercive force of the magnetic film viewed from the easy direction, the other of the conductors has applied thereto an energizing signal to magnetize the film in a hard direction of magnetization, and further said one of the conductors has applied thereto an appropriate bias signal to saturate the film in the easy direction while the small signal and the energizing signal are terminated, whereby the impedance of said one of the conductors with respect to the small signal applied thereto increases by application of the energizing signal.

The novel features of this invention are set forth with particularity in the appended claims. This invention, however, both as to its construction and operation together with further advantages thereof, may best be understood by reference to the following description, taken in connection with the accompanying drawings, in which:

FIG. 1 is a diagram illustrating characteristic curves for explaining the operational principle of the regulable reactor of this invention;

FIG. 2(A) and 2(B) are perspective views showing embodiments of the regulable reactor of this invention;

FIG. 2(C) is a schematic of an equivalent circuit for explaining the operations of embodiments shown in FIGS. 2(A) and 2(B);

FIGS. 3(A) and 3(B) are perspective views showing other embodiments of the regulable reactor of this invention;

Figure 9A:
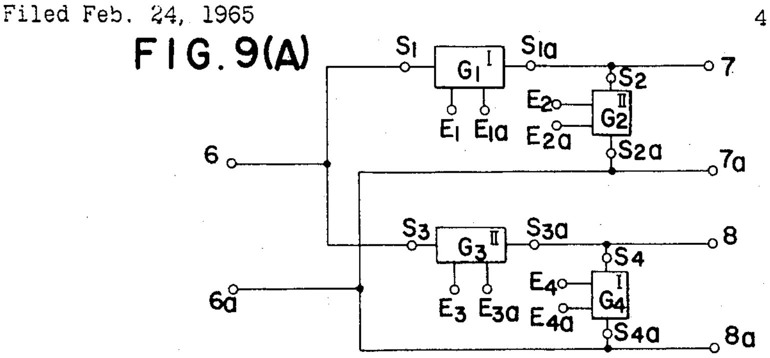
Figure 9B:
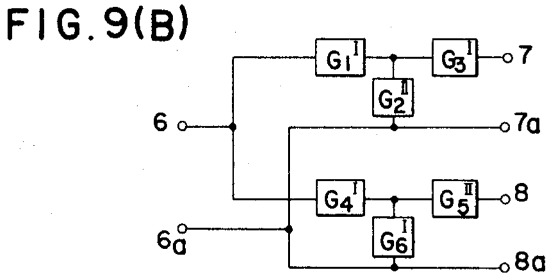
Figure 10A:
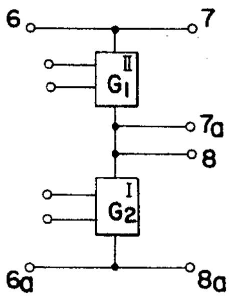
Figure 10B:
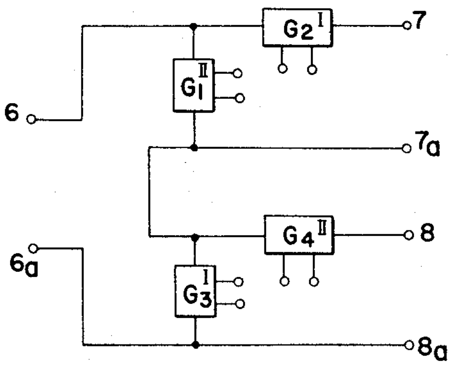
Figure 10C:
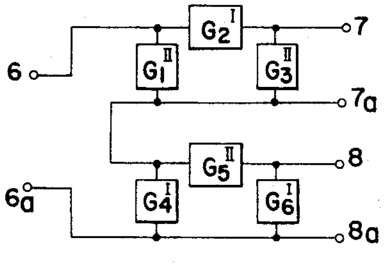
Figure 11A:
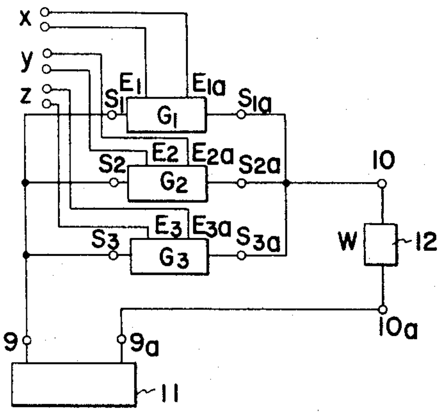
Figure 11B:
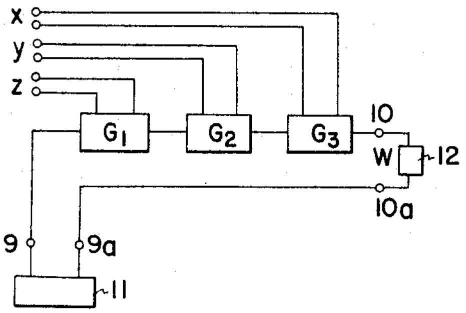
Figure 11C:
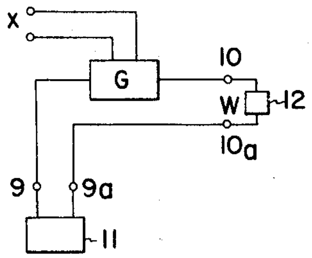

FIGS. 5(A), 5(B), 6(A), 6(B), 7(A), 7(B) and 8 are diagrams of gate circuits employing the regulable reactor or reactors of this invention;

FIGS. 9(A), 9(B), 10(A), 10(B) and 10(C) are diagrams of distributing circuits employing the regulable reactors of this invention; and FIGS. 11(A), 11(B) and 11(C) are diagram logical circuits employing the regulable reactors of this invention.

Figure 1:
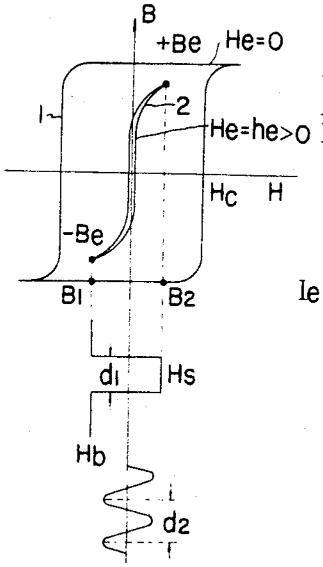

The principal operation of a regulable reactor according to this invention will be first described. A magnetic film having an easy direction of magnetization has characteristic curves of magnetization viewed in the easy direction as shown in FIG. 1. Such characteristic curves vary in accordance with the field intensity $H_e$ of an energizing signal $I_e$ applied in the hard direction of magnetization of the film. As shown in the FIG. 1, the curve assumes a rectangular form in the case when $H_e=0$; and the curve decreases to a loop 2 in the case when $H_e(=h_e\ \ 0)$ whereby the area of the hysteresis loop decreases according to a decrease in the coercive force $H_c$. When a small magnetic field $H_s$ less than the coercive force $H_c$ of the major hysteresis loop 1 is applied to the film in the easy direction, the film is magnetized along a part of the major hysteresis loop 1 as ($B_1$–$B_2$–$B_1$) in the case when $H_e=0$, whereby the magnetic flux density B does not substantially vary if the film is composed of a good substance having a rectangular hysteresis characteristic. When the magnetic field $H_e(=h_e>0)$ is applied in the hard direction to the film, the magnetic flux density varies, by the field $H_s$, between ($-B_e$) and ($+B_e$) along a small hysteresis loop 2. Accordingly, the magnitude of displacement of the magnetic flux density is equal to a difference ($2B_e$) thereof. Because of such displacement, the film assumes an inductance corresponding to this displacement ($2B_e$). If the field $H_s$ is caused by a pulse signal $I_s$, the film will have a minimum inductance with respect to the signal $I_s$ in the case when $H_e=0$, and the film will have a relatively large inductance with respect to the signal $I_s$ in the case when $H_e=h_e>0$. It is desirable that the duration of the pulse signal $I_s$ be short and less than a duration $d_1$ substantially capable of magnetizing the film along the major hysteresis loop (1 or 2 . . .) in order to obtain such intended large inductance. This intended effect is also accomplished by the use of a high frequency signal $I_f$ having a period $d_2$ less than said short duration. Moreover, a bias field $H_b$ is applied to the film to saturate the film in the easy direction while the signal $I_s$ and the signal $I_e$ are terminated. By the application of the bias field, residual magnetism is established at a certain condition (—B or +B); therefore, it is possible to set a regular condition against a next succeeding signal $I_s$ or $I_f$ applied in the easy direction. In conformity with the principle, the impedance of the film can be regulated to a high value or a low value with or without the energizing field $H_e$ in the hard direction of the film.

Figure 2A:
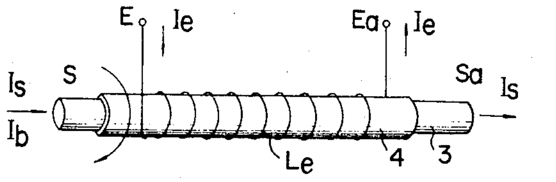
Figure 2B:
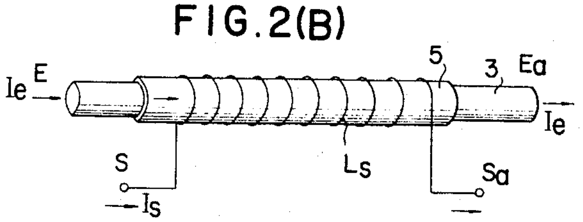

FIGS. 2(A) and 2(B) show embodiments of the regulable reactor of this invention based on the above principle using a cylindrical ferromagnetic film, in which the film is deposited by evaporation, by electrical plating or by a manufacturing method for clad wire on a conductive wire (for example, copper). Although the conductive wire 3 of a circular section is employed in these embodiments, a conductor of another section can be employed. Such a conductor 3 with ferromagnetic film is hereinafter referred to as "magnetic wire." In the case of FIG. 2(A), the easy direction of magnetization is established in the transverse direction of the magnetic wire 4, a coil $L_e$ is wound on the magnetic wire 4, the energizing current $I_e$ is applied to terminals E and $E_a$ of the coil $L_e$, and the small signal $I_s$ is applied to terminals S and $S_a$ of the conductor 3. When $I_e=0$, the magnetic wire 4 assumes a low impedance against the current $I_s$ since there is no displacement of the flux density as the result of magnetization of the film along the major loop 1; but when the current $I_e$ is caused to flow so that $H_e=h_e>0$, the magnetic wire 3 assumes a relatively large impedance against the current $I_s$ since the magnetization of the film is along the small hysteresis loop 2.

FIG. 2(B) shows another embodiment of the regulable reactor of the invention. In this case, the easy direction of magnetization of the film is established in the longitudinal direction of the conductive wire 3, the energizing current $I_e$ is applied to the conductive wire 3, and the small signal $I_s$ is applied to a coil $L_s$ wound on the magnetic wire 5, whereby it is possible to regulate the impedance of the coil $L_s$ presented at terminals S and $S_a$.

Figure 2C:
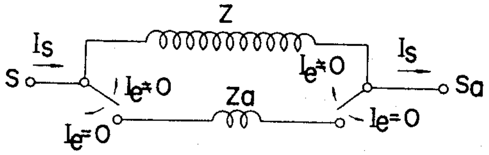

The above-mentioned regulable reactor can be illustrated by an equivalent circuit as shown in FIG. 2(C), in which a small impedance $Z_a$ and a large impedance Z are alternately switched in accordance with whether the magnitude of the current $I_e$ is zero or whether it is not zero, where $Z \gg Z_a$. In the case of FIG. 2(A), the intensity of the energizing field $H_e$ is proportional to a value $N \cdot I_e$, so that the impedance of the magnetic wire 4 with respect to the small signal $I_s$ can be controlled by a relatively small current, N being the number of turns of the coil $L_e$. In the other case of FIG. 2(B), since the impedance of the coil $L_s$ is proportional to a value $N^2$ (N is the number of turns of the coil $L_s$), a relatively large impedance with respect to the current $I_e$ can be obtained.

Figure 3A:
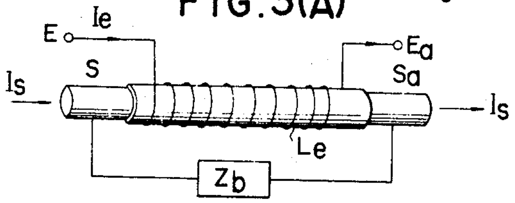
FIG. 3(C) is an equivalent circuit for explaining the operations of embodiments shown in FIGS. 3(A) and 3(B)
Figure 3A:
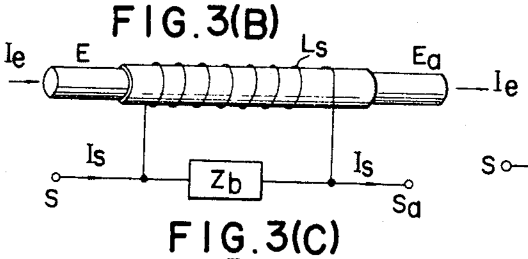
Figure 3C:
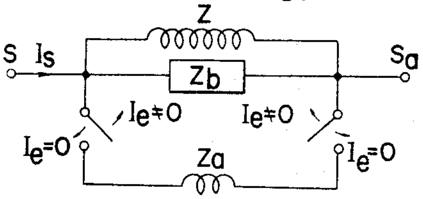

If another impedance $Z_b$ is connected to each of the coils $L_e$ and $L_s$ as shown in FIGS. 3(A) and 3(B) where $Z \gg Z_b \gg Z_a$, the impedance of the terminals S and $S_a$ is equal to a value $(Z_a/Z_b)$ in the case when $I_e=0$ or a value $(Z_b/Z)$ in the case of the application of the current $I_e$. According to the assumed condition $Z \gg Z_b \gg Z_a$, values $(Z_a/Z_b)$ and $(Z_b/Z)$ are, respectively, approximately equivalent to values $(Z_b)$ and $(Z)$. Consequently, the impedance of the terminals S and $S_a$ can be adjusted from $Z_b$ to Z. FIG. 3(C) shows an equivalent circuit for illustrating the operational principle of these cases.

Figure 4:
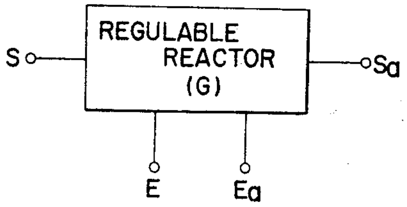
FIG. 4 is a simplified block diagram of the regulable reactor of this invention.

In each of the cases shown in FIGS. 2(A) and 2(B), the impedance of the terminals S and $S_a$ assumes a low or large impedance in accordance with the presence or absence of the energizing current $I_e$ applied to terminals E and $E_a$ of the conductor to be applied with the current $I_e$. For simplifying the illustration, the regulable reactors described with reference to FIGS 2(A), 2(B), 2(C), 3(A), 3(B), and 3(C) are hereinafter simply illustrated as shown in FIG. 4. In the following description, applications of the regulable reactor G to gating means are described in detail.

Figure 5A:
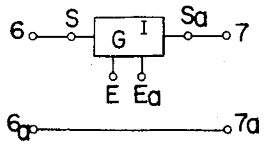
Figure 5B:
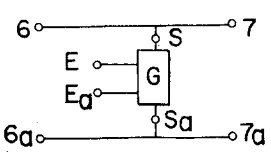

Each of the gating circuits described below has a pair of input terminals 6 and **6*a* for receiving the small input signal $L_s$ and at least one pair of output terminals 7 and 7*a* for taking out the small signal $I_s$ passed therethrough. In the embodiment shown in FIG. 5(A), the regulable reactor G is inserted in series between the input terminal 6 and the output terminal 7. In the embodiment of FIG. 5(B), the regulable reactor G is inserted in parallel in the path from the terminals 6 and 6*a* to the terminals 7 and 7*a*. As a result of these arrangements, the small signal $I_s$ is intercepted or passed in accordance with the application or the termination of the energizing current $I_e$ applied to the terminals E and $E_a$. In these gating circuits, the small signal $I_s$ is passed, by termination of the energizing signal $I_e$, through the series inserted regulable reactor G, or passed by energizing the parallel inserted regulable reactor G, or passed by energizing the parallel inserted regulable reactor G. In the following embodiments, this principle is applied with respect to paths between the input terminals 6 and 6*a* and the output terminals 7 and 7*a***.

Figure 6A:
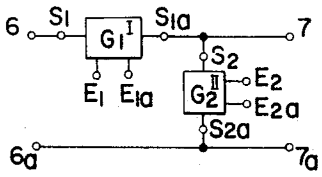
Figure 6B:
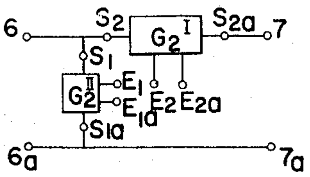
Figure 7A:
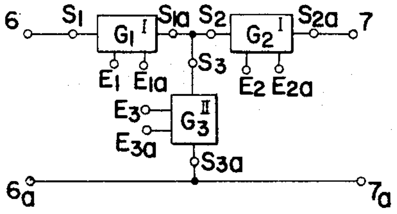
Figure 7B:
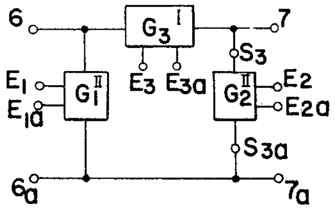

FIGS. 6(A) and 6(B) show gate circuits formed in "inverted L connection," and FIGS. 7(A) and 7(B) show gate circuits, respectively, formed in a "T connection" and a "$\pi$ connection." In these embodiments, the energizing signal $I_e$ is alternately applied to gate circuits designated as "I" and gate circuits designated as "II." Attenuation of the small signal $I_e$ assumed at the closed conditions of the latter two gate circuits are larger than those of the former two gate circuits. Another different connection (not shown) can be easily constructed by the use of a plurality of such regulable reactors G, and larger attenuation in the case of closed conditions is accomplished by connecting the reactor G in plural stages.

Figure 8:
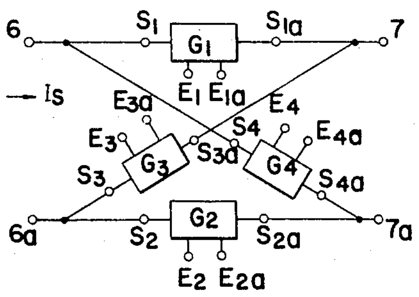

FIG. 8 shows a bridge connection (lattice connection) of four regulable reactors $G_1$, $G_2$, $G_3$ and $G_4$. One pair of opposed corners are employed as the input terminals 6 and **6*a*, and the other pair of opposed corners are employed as the output terminals 7 and 7*a*. In this bridge circuit, if the impedances of the four gate circuits $G_1$, $G_2$ $G_3$, and $G_4$ are equal to one another when $I_e=0$ with respect to all of four gate circuits, or the current $I_e$ is applied to all of the four gate circuits, the small signal $I_s$ applied to the input terminal 6 and 6*a* will not appear at the output terminal 7 and 7*a* as a result of equilibrium of the bridge circuit. These two cases constitute the so-called closed condition of this gate circuit. When only one pair selected from opposed arms ($G_1$ and $G_2$) or ($G_3$ and $G_4$) of the bridge is energized by the energizing signal $I_e$, the small signal $I_e$ appears at the output terminals 7 and 7*a*** because of disruption of the equilibrium condition of the bridge. In this case, the small signal is caused to appear with normal polarity by energizing the pair of opposed arms $G_1$ and $G_2$, but its polarity is inverted by energizing the pair of opposed arms $G_3$ and $G_4$.

In this paragraph, embodiments for distributing the small signal $I_s$ applied to the input terminals to a plurality of pairs of output terminals are described. FIG. 9(A) shows one of such embodiment, in which two gate circuits each as shown in FIG. 6(A) are employed and connected in parallel at the input terminals 6 and **6*a*. By applying the energizing signal $I_e$ to the gating circuits ($G_1$ and $G_4$) designated as "I" or to the gating circuits ($G_2$ and $G_4$) designated as "II," the small signal applied to the input terminals 6 and 6*a* is alternately taken out of the output terminals (8 and 8*a*) or (7 and 7*a***).

FIG. 9(B) shows an embodiment employing two groups of gate circuits each arranged in a T connection. Its operation principle is the same as that of the embodiment of FIG. 9(A).

A distributing circuit of another type is shown in FIG. 10(A), in which two regulable reactors $G_1$ and $G_2$ alternately energized are employed and connected in series, the input terminals 6 and **6*a* are the two terminals of the series connection, the respective output terminals (7 and 7*a*) or (8 and 8*a*) being either of the input terminals 6 and 6*a* and the connection point of the series connection. According to this arrangement, the small signal $I_e$ appears at either pair of the output terminals (7 and 7*a*) or (8 and 8a). Into the output paths of this embodiment, two groups of gate circuits can be inserted. FIGS. 10(B) and 10(C) are such embodiments, in which each of the groups of gate circuits is inserted in cascade in the path of the output terminals (7 and 7*a*) and (8 and 8*a*). Any of the gate circuits as shown in FIGS. 5(A), 6(B) and 7(A) can be employed as the gate circuit of each group. The small signal passed is taken out of, through either group of such inserted gate circuits, the output terminals (7 and 7*a*) or (8 or 8*a***).

By employing a plurality of groups of gate circuits in which a pair of input terminals and a plurality of pairs (more than two) of output terminals are provided, the small signal $I_s$ can be switched to any pair of output terminals.

Such a regulable reactor G can be employed for constructing logical circuits as well as the gate circuits by the use of the small signal $I_s$ passed as the energizing signal $I_e$ of the immediately succeeding regulable reactor G. Embodiments of these logical circuits are described below.

Embodiments of three-input logical circuits are shown in FIGS. 11(A) and 11(B). FIG. 11(A) shows a NOT-AND circuit for three input signals $x$, $y$ and $z$, which are applied, respectively, to three pairs of energizing terminals ($E_1$ and $E_{1a}$), ($E_2$ and $E_{2a}$) and ($E_3$ and $E_{3a}$) of regulable reactors $G_1$, $G_2$ and $G_3$. Each of the terminals ($S_1$, $S_2$ and $S_3$) and each of the terminals ($S_{1a}$, $S_{2a}$ and $S_{3a}$) are connected together so that the regulable reactors $G_1$, $G_2$ and $G_3$ are connected in parallel with one another. A signal $I_0$ to be controlled is applied from a generator 11. In this arrangement, when any of three input signals $x$, $y$ and $z$ is not applied to the terminals therefor, the impendance of each pair of terminals ($S_1$ and $S_{1a}$), ($S_2$ and $S_{2a}$) and ($S_3$ and $S_{3a}$) is low, so that the signal $I_0$ applied to the terminals 9 and 9*a* appears, substantially as it is, at the terminals 10 and 10*a* of a load 12. Accordingly, the output W is "1," when $x=0$, $y=0$, and $z=0$. When one or two of three input signals $x$, $y$ and $z$ is/are applied to the corresponding terminals, the terminal impedance of the remaining regulable reactor not applied is still low, whereby the signal $I_0$ is passed. However, if all the input signals $x$, $y$ and $z$ are applied respectively to terminals ($S_1$ and $S_{1a}$), ($S_2$ and $S_{2a}$) and ($S_3$ and $S_{3a}$), respective impedances of the regulable reactors $G_1$, $G_2$ and $G_3$ become high. Consequently, the signal $I_0$ appears at the terminals 10 and 10*a* after being extremely attenuated; that is, $w=0$, when $x=1$, $y=1$, and $z=1$. The logical expression of this circuit can be accordingly written as follows:

$$w=\bar{x}\cdot\bar{y}\cdot\bar{z} \quad (1)$$

FIG. 11(B) shows an embodiment of a NOT–OR circuit the logical expression of which can be written as follows:

$$w=\overline{x+y+z} \quad (2)$$

FIG. 11(C) shows an embodiment of a NOT circuit the logical expression of which can be written as follows:

$$w=\bar{x} \quad (3)$$

In these logical circuits, a more complex connection of the regulable reactors G as described above is easily employed as respective elements of the logical circuits.

The magnetic wire 4 or 5 employing the regulable reactor of this invention can be also constructed by evaporation or printing, etc., on a substratum in the condition of a slender film conductor sandwiched between ferromagnetic films.

As described above in detail, the regulable reactor of this invention can be made to have miniature size and simple arrangement, and it has the advantage of being capable of controlling also a signal of direct current or alternating current having relatively large magnitude (for example, 500 milli-amperes to 1 ampere) by means of a ferromagnetic film of relatively large coercive force. In conventional memory devices, information signals to be gated are amplified after being switched because of the impossibility of direct control of a large signal and applied to respective row or column conductors. However, by employing the regulable reactors of this invention, such amplifying means can be omitted. Accordingly, memory devices including periphero circuitry can be constructed to be of small size and be economical.

Since it is obvious that many changes and modifications can be made in the above described details without departing from the nature and spirit of the invention, it is to be understood that the invention is not to be limited to the details described herein except as set forth in the appended claims.

What I claim is:

1. A combination comprising: first and second conductors and a ferromagnetic film having an easy direction of magnetization, said conductors being magnetically connected to said film, one of said conductors being provided with said film deposited thereon; means connected to one of said conductors to apply an appropriate small signal, thereby magnetizing said film in the easy direction, said small signal being less than the intensity producible of a magnetomotive force which is equal to the coercive force of the magnetic film viewed in the easy direction; means for applying an energizing signal to the other of said conductors to magnetize said film in a hard direction of magnetization; and means for applying an appropriate bias signal to said one of said conductors to saturate the film in the easy direction while said small signal and said energizing signal are terminated, whereby the impedance of said one of the conductors with respect to the small signal applied thereto is increased by application of the energizing signal.

2. A regulable reactor as set forth in claim 1, in which the small signal is a pulse signal the duration of which is less than a short duration substantially capable of magnetizing the magnetic film according to the major hysteresis loop of magnetization thereof.

3. A regulable reactor as set forth in claim 1, in which the small signal is a high frequency signal the period of which is less than a period substantially capable of magnetizing the magnetic film according to the major hysteresis loop of magnetization thereof.

4. A combination comprising: first and second conductors and a ferromagnetic film having an easy direction of magnetization, the first conductor being covered with said ferromagnetic film deposited thereon the easy direction of which is established in the transverse direction of the first conductor, the second conductor being wound on the first conductor to apply an appropriate small signal, thereby magnetizing said film in the easy direction, said small signal being less than the intensity producible of a magnetomotive force which is equal to the coercive force of the magnetic film viewed in the easy direction; means for applying an energizing signal to the second conductor to magnetize said film in a hard direction of magnetization; and means for applying an appropriate bias signal to the first conductor to saturate the film in the easy direction while said small signal and said energizing signal are terminated, whereby the impedance of the first conductor with respect to the small signal applied thereto is increased by application of the energizing signal.

5. A combination according to claim 4, including an impedance, means connecting the first conductor is connected in parallel with said impedance.

6. A combination comprising: first and second conductors and a ferromagnetic film having an easy direction of magnetization, the first conductor being covered with said ferromagnetic film deposited thereon the easy direction of which is established in the longitudinal direction of the first conductor, the second conductor being wound on the first conductor with the ferromagnetic film; means connected to the second conductor to apply an appropriate small signal, thereby magnetizing said film in the easy direction, said small signal being less than the intensity producible of a magnetomotive force which is equal to the coercive force of the magnetic film viewed in the easy direction; means for applying an energizing signal to the first conductor to magnetize said film in a hard direction of magnetization; and means for applying an appropriate bias signal to the second conductor to saturate the film in the easy direction while said small signal and said energizing signal are terminated, whereby the impedance of the second conductor with respect to the small signal is increased by application of the energizing signal.

7. A combination according to claim 6, wherein the second conductor is connected in parallel with an appropriate impedance.

8. A combination comprising a plurality of unit gate circuits, each comprising: first and second conductors and a ferromagnetic film having an easy direction of magnetization, said conductors magnetically connected to said film, one of said conductors being covered with said film deposited thereon, means connected to one of said conductors to apply an appropriate small signal, thereby magnetizing said film in the easy direction, said small signal being less than the intensity producible of a magnetomotive force which is equal to the coercive force of the magnetic film viewed in the easy direction, means for applying an energizing signal to the other of said conductors to magnetize said film in a hard direction of magnetization, and means for applying an appropriate bias signal to said one of conductors to saturate the film in the easy direction while said small signal and said energizing signal are terminated; said combination having at least one pair of input terminals and at least one pair of output terminals; said one of the conductors, to which the small signal is applied, of at least one unit gate circuit being inserted in series between the input terminal and the output terminal; said one of the conductors, to which the energizing signal is applied, of at least one unit gate circuit being inserted in parallel in the path from the input terminals and the output terminals; said energizing signal being alternately applied to said series inserted unit gate circuit and said parallel inserted unit gate circuit, whereby a small signal applied to the input terminals passes to the output terminals when said energizing signal is applied to said parallel inserted unit gate circuit.

9. A combination according to claim 8, in which said unit gate circuits are arranged in a T connection between the input terminals and the output terminals.

10. A combination according to claim 8, in which said unit gate circuits are arranged in a $\pi$ connection between the input terminals and the output terminals.

11. A combination comprising four unit gate circuits, each comprising: first and second conductors and a ferromagnetic film having an easy direction of magnetization, said conductors being magnetically connected to said film, one of said conductors being covered with said film deposited thereon, means connected to one of said conductors to apply an appropriate small signal, thereby magnetizing said film in the easy direction, said small signal being less than the intensity producible of a magnetomotive force which is equal to the coercive force of the magnetic film viewed in the easy direction, means for applying an energizing signal to the other of said conductors to magnetize said film in a hard direction of magnetization, and means for applying an appropriate bias signal to said one of conductors to saturate the film in the easy direction while said small signal and said energizing signal are terminated; respective said conductors, to each of which the small signal is to be applied, being arranged in a bridge circuit; one pair of opposed junctions of the bridge circuit defining input terminals for receiving the small signal, the other pair of opposed junctions of the bridge circuit defining output terminals for taking out the small signal passed through the bridge; only one pair selected of opposed arms of the bridge being energized by said energizing signal when the small signal is to be passed from the input terminals to the output terminals.

12. A combination comprising two unit gate circuits each comprising: first and second conductors and a ferromagnetic film having an easy direction of magnetization, said conductors being magnetically connected to said film, one of said conductors being covered with said film deposited thereon, means connected to one of said conductors to apply an appropriate small signal, thereby magnetizing said film in the easy direction, said small signal being less than the intensity producible of a magnetomotive force which is equal to the coercive force of the magnetic film in the easy direction, means for applying an energizing signal to the other of said conductors to magnetize said film in a hard direction of magnetization, and means for applying an appropriate bias signal to said one of conductors to saturate the film in the easy direction while said small signal and said energizing signal are terminated; said conductors, to each of which the small signal is to be applied, being connected in series in which the two terminals of said series connection are employed as input terminals for receiving the small signal and either terminals of the input terminals and connection point of said series connections are employed as output terminals for taking out the small signal so that two pairs of the output terminals are obtained; said conductors, to which the energizing signal are to be applied, being alternately energized by the energizing signal, whereby the small signal can be derived from either of the two pairs of the output terminals.

13. A combination according to claim 12, including two additional unit gate circuits alternately energized by the energizing signal, two conductors, to each of which the small signal is to be applied, of said two additional unit gate circuits being respectively inserted into said two pairs of output terminals thereby to obtain the small signal through one of said additional inserted unit gate circuits which is not energized.

14. A combination according to claim 12, in which two groups of said unit gate circuits are added; each of said groups having one pair of first terminals and at least one pair of second terminals, one of the conductors, to which the small signal is to be applied, of at least one added unit gate circuit of each group being inserted in series between the first terminal and the second terminal, one of the conductors, to which the energizing signal is to be applied, of at least one added unit gate circuit of each group being inserted in parallel in the path from the first terminals and the second terminals, said energizing signal being alternately applied to said series inserted unit gate circuit and said parallel inserted unit gate circuit in each group; whereby the impedance between the first terminals and the second terminals is increased when said energizing signal is applied to said parallel inserted unit gate circuit; said two groups being respectively inserted in cascade in the path of the output terminals, whereby the small signal is taken out through either of said one of said groups whose each series connected unit gate circuit is not energized.

15. A combination according to claim 14, in which each of said groups is arranged in a $\pi$ connection together with one of said two gate circuits.

16. A combination according to claim 14, in which each of said groups is arranged in a T connection.

17. A combination comprising a plurality of unit gate circuits each comprising: first and second conductors and a ferromagnetic film having an easy direction of magnetization, said conductors being magnetically connected to said film, one of said conductors being covered with said film deposited thereon, means connected to one of said conductors to apply an appropriate small signal, thereby magnetizing said film in the easy direction, said small signal being less than the intensity producible of a magnetomotive force which is equal to the coercive force of the magnetic film in the easy direction, means for applying an energizing signal to the other of said conductors to magnetize said film in a hard direction of magnetization, and means for applying an appropriate bias signal to said one of conductors to saturate the film in the easy direction while said small signal and said energizing signal are terminated; said conductors, to each of which the small signal is to be applied, being connected in parallel; the small signal being applied to a load through said parallel connected unit gate circuits; a plurality of said energizing signals being respectively applied to corresponding conductors, to each of which the energizing signal is to be applied, whereby the small signal appears at the load as a result of NOT-AND logic with respect to said plurality of energizing signals.

18. A combination comprising a plurality of unit gate circuits each comprising: first and second conductors and a ferromagnetic film having an easy direction of magnetization, said conductors being magnetically connected to said film, one of said conductors being covered with said film deposited thereon, means connected to one of said conductors to apply an appropriate small signal thereby magnetizing said film in the easy direction, said small signal being less than the intensity producible of a magnetomotive force which is equal to the coercive force of the magnetic film in the easy direction, means for applying an energizing signal to the other of said conductors to magnetize said film in a hard direction of magnetization, and means for applying an appropriate bias signal to said one of said conductors to saturate the film in the easy direction while said small signal and said energizing signal are terminated; said conductors, to each of which the small signal is to be applied, being connected in series; a load receiving the small signal being applied through said series connected unit gate circuits; a plurality of said energizing signals being respectively applied to corresponding conductors, to each of which the energizing signal is to be applied, whereby the small signal appears at the load as a result of NOT-OR logic with respect to said plurality of energizing signals.

References Cited

UNITED STATES PATENTS

| | | | |
|---|---|---|---|
| 2,811,652 | 10/1957 | Lipkin | 307—88 |
| 3,275,842 | 9/1966 | Baycura | 307—88 |
| 3,292,074 | 12/1966 | Mortimer | 307—88 |
| 3,366,939 | 1/1968 | De Chandeloup | 340—174 |

BERNARD KONICK, *Primary Examiner.*

J. BREIMAYER, *Assistant Examiner.*